United States Patent
Khosravi et al.

(10) Patent No.: US 10,060,384 B2
(45) Date of Patent: Aug. 28, 2018

(54) SYSTEM AND METHOD FOR AIR-FUEL MIXTURE FORMATION IN AN INTERNAL COMBUSTION ENGINE

(71) Applicant: Ford Global Technologies, LLC, Dearborn, MI (US)

(72) Inventors: Maziar Khosravi, Cologne (DE); Florian Huth, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 15/174,726

(22) Filed: Jun. 6, 2016

(65) Prior Publication Data
US 2016/0369738 A1 Dec. 22, 2016

(30) Foreign Application Priority Data

Jun. 18, 2015 (DE) .................. 10 2015 211 284

(51) Int. Cl.
*F02F 1/42* (2006.01)
*F02M 35/10* (2006.01)
*F02B 27/02* (2006.01)
*F02B 27/00* (2006.01)

(52) U.S. Cl.
CPC ........ *F02F 1/4235* (2013.01); *F02B 27/0231* (2013.01); *F02M 35/10072* (2013.01); *F02M 35/10301* (2013.01); *F02B 27/006* (2013.01); *F02B 2275/48* (2013.01); *F02M 35/10157* (2013.01); *Y02T 10/125* (2013.01); *Y02T 10/146* (2013.01)

(58) Field of Classification Search
CPC ......... F02M 35/10137; F02M 35/1222; F02M 35/10091; F02M 35/10144

USPC ............... 123/301, 306, 184.51, 184.53
See application file for complete search history.

(56) References Cited

U.S. PATENT DOCUMENTS

| | | | |
|---|---|---|---|
| 5,143,026 A * | 9/1992 | Brustle | F02B 27/02 123/184.55 |
| 5,526,789 A | 6/1996 | Stein et al. | |
| 6,827,060 B2 | 12/2004 | Hue | |
| 7,533,645 B2 * | 5/2009 | Fujiwara | F02B 27/0215 123/184.55 |
| 8,516,986 B2 * | 8/2013 | Silvano | F02M 35/10118 123/184.53 |
| 2014/0145121 A1 | 5/2014 | Dhabi et al. | |
| 2014/0165960 A1 | 6/2014 | Han et al. | |
| 2014/0230782 A1 | 8/2014 | Fabros | |

FOREIGN PATENT DOCUMENTS

| | | |
|---|---|---|
| CN | 203670044 U | 6/2014 |
| DE | 4041200 A1 | 7/1992 |
| DE | 19634913 A1 | 3/1998 |
| DE | 10228569 A1 | 1/2004 |

* cited by examiner

*Primary Examiner* — Hieu T Vo
*Assistant Examiner* — Arnold Castro
(74) *Attorney, Agent, or Firm* — Julia Voutyras; McCoy Russell LLP

(57) ABSTRACT

Methods and systems are provided for forming an air-fuel mixture in a combustion chamber of an internal combustion engine. In one example, a system may include an adjustable intake line coupled to an inlet opening of the cylinder. The system may adjust turbulence formed in the cylinder in response to engine operating conditions by controlling a pivoting angle between a first section of the intake line and a second section of the intake line.

17 Claims, 4 Drawing Sheets

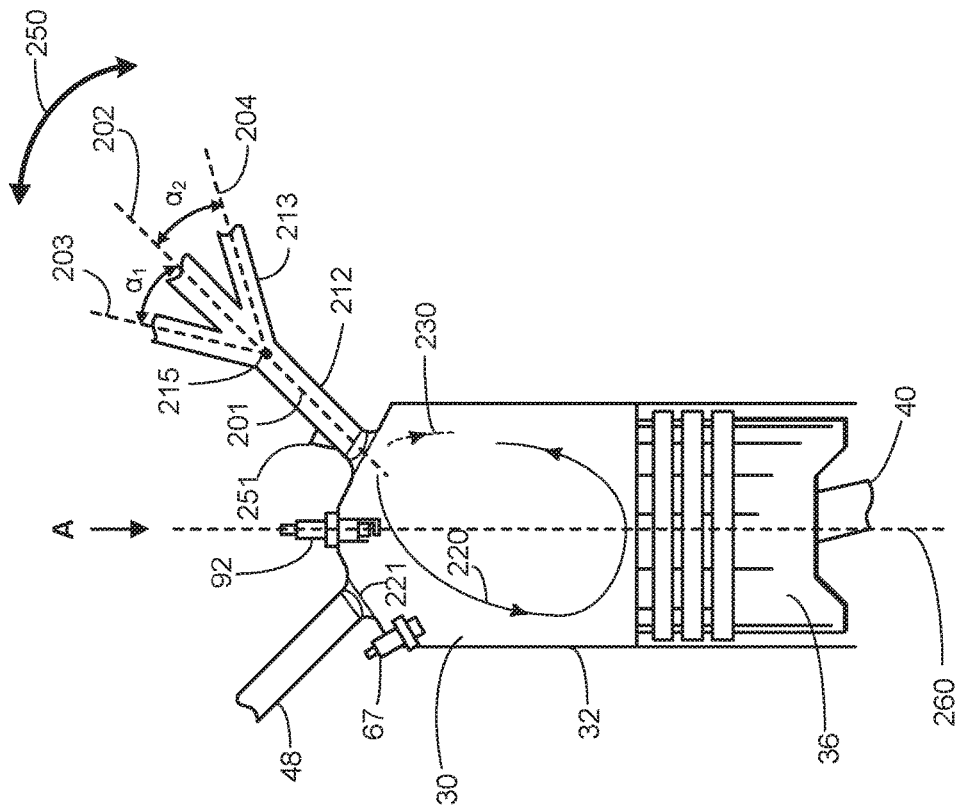
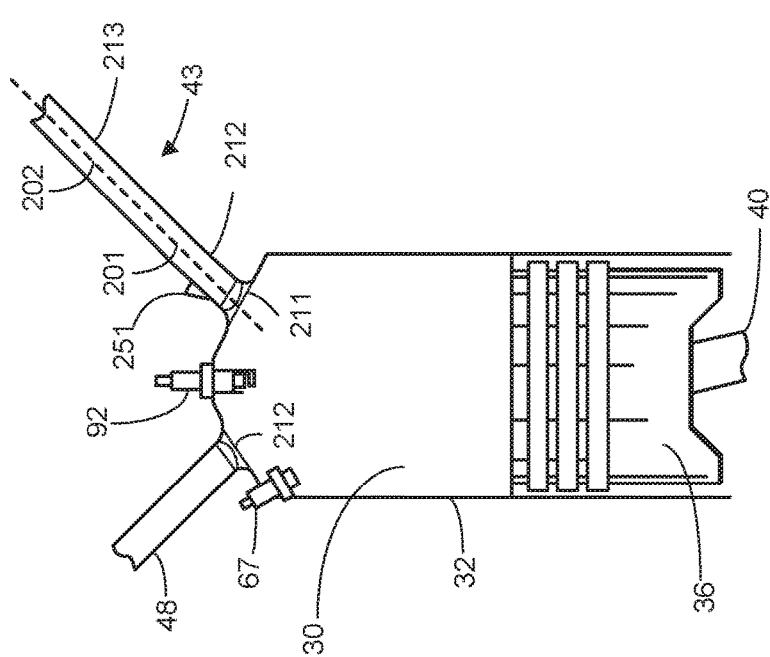
FIG. 2B
FIG. 2A

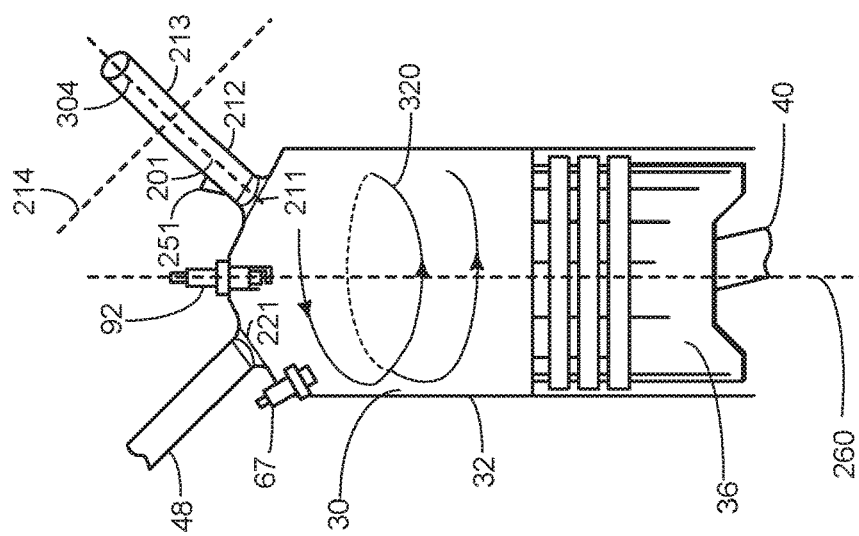
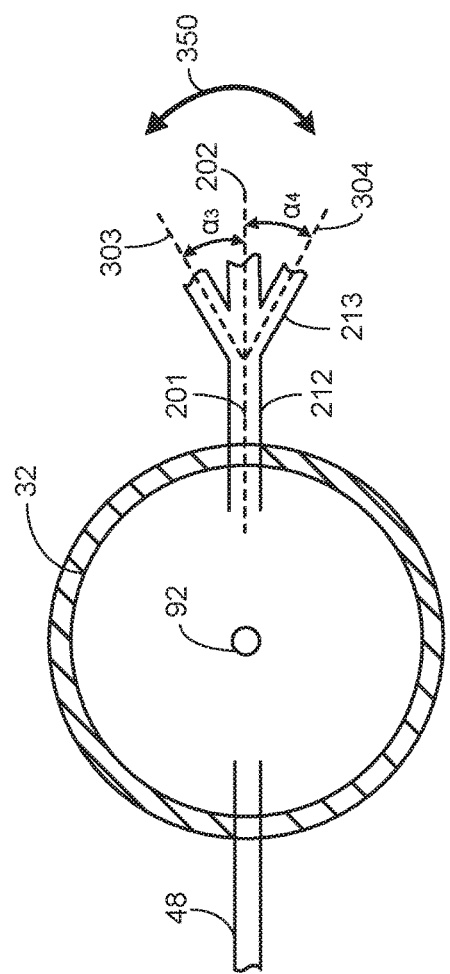
FIG. 3A
FIG. 3B

SYSTEM AND METHOD FOR AIR-FUEL MIXTURE FORMATION IN AN INTERNAL COMBUSTION ENGINE

CROSS REFERENCE TO RELATED APPLICATION

This application claims priority to German Patent Application No. 102015211284.5, filed Jun. 18, 2015, the entire contents of which are hereby incorporated by reference for all purposes.

FIELD

The present description relates generally to methods and systems for forming an air-fuel mixture within a cylinder of an internal combustion engine through an adjustable intake line.

BACKGROUND/SUMMARY

Distribution of air-fuel mixture in a combustion chamber of an internal combustion engine at the time of ignition closely relates to engine performance and crude pollutant emission, in particular emission of unburned hydrocarbons, carbon monoxide, and particles. Gasoline direct injection provides improved fuel efficiency and high power output. For engines with gasoline direct injection, stratified air-fuel mixture may form at the time of ignition, wherein a richer air-fuel mixture is in proximity to an ignition device. Stratified air-fuel mixture offers thermodynamic advantages in particular in the lower and middle load range, when relatively low amounts of fuel are to be injected.

Different methods may be used to form stratified air-fuel mixture in the combustion chamber. For example, in an air-controlled method, charge is conducted into the combustion chamber forcibly to mix with an injected fuel. Within the combustion chamber, charge movement such as tumble and swirl of the air-fuel mixture may form to accelerate and assist the mixture formation. A tumble is an air vortex about an imaginary axis parallel to the axis of rotation of the crankshaft. A swirl, on the other hand, constitutes an air vortex about an axis runs parallel to the longitudinal axis of the cylinder. A fuel injection jet directed counter to the tumble may distribute the fuel extensively throughout the entire combustion chamber.

The arrangement and the geometry of an intake system of the engine have a significant influence on the charge movement and thus on the air-fuel mixture formation in the combustion chamber. Other attempts to address the charge movement include arranging a pivotable flap or plate within an intake line of the engine. One example approach is shown by Huh et al. in U.S. Pat. No. 6,827,060 B2. Therein, by pivoting the flap attached to the inner wall of the intake line, the fuel-air mixture drawn through the intake line during charge exchange flows predominantly on the side opposite to the flap.

However, the inventors herein have recognized potential issues with such systems. As one example, the adjustment mechanism with the flaps is highly cumbersome and expensive. Moreover, the pivotable flaps may restrict flow and lead to significant pressure drop of charged air flowing through the intake line. Further, soot may accumulate on the flap mechanism and cause malfunction, especially in an engine with exhaust recirculation system.

In one example, the issues described above may be addressed by an adjustable intake line for an engine system, comprising: a first section directly coupled to an inlet opening of an engine cylinder, and a second section mechanically coupled to the first section and pivotable relative to the first section via an actuator. In this way, air-fuel mixture distribution in the combustion chamber may be controlled by pivoting the second section of the intake line relative to the first section of the intake line. Further, wall wetting may be reduced and cooling of the combustion chamber wall may be increased.

As one example, an intake line for conducting charge into a combustion chamber of an engine includes two sections. By adjusting a pivoting angle between the central axis of the first section and the central axis of the second section, turbulence formed in the combustion chamber may be controlled in response to engine operating conditions. As such, charge motion may be specifically adjusted based on the known geometry of the combustion chamber and the condition under which the engine is operating. By controlling charge motion in response to engine operating conditions, reliable combustion may be achieved. By eliminating the flap within the intake line, the adjustable intake line may function more reliable comparing to Huh's intake line. Moreover, the adjustable intake line disclosed herein provides a simple configuration that may easily replace a conventional intake line of an engine system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A is side view of an engine cylinder with an adjustable intake line at a zero position.

FIG. 2B shows a tumble formed within the combustion chamber by actuating the adjustable intake line.

FIG. 3A is a top view of the engine cylinder with the adjustable intake line.

FIG. 3B shows a swirl formed within the combustion chamber by actuating the adjustable intake line.

DETAILED DESCRIPTION

Figure 1:
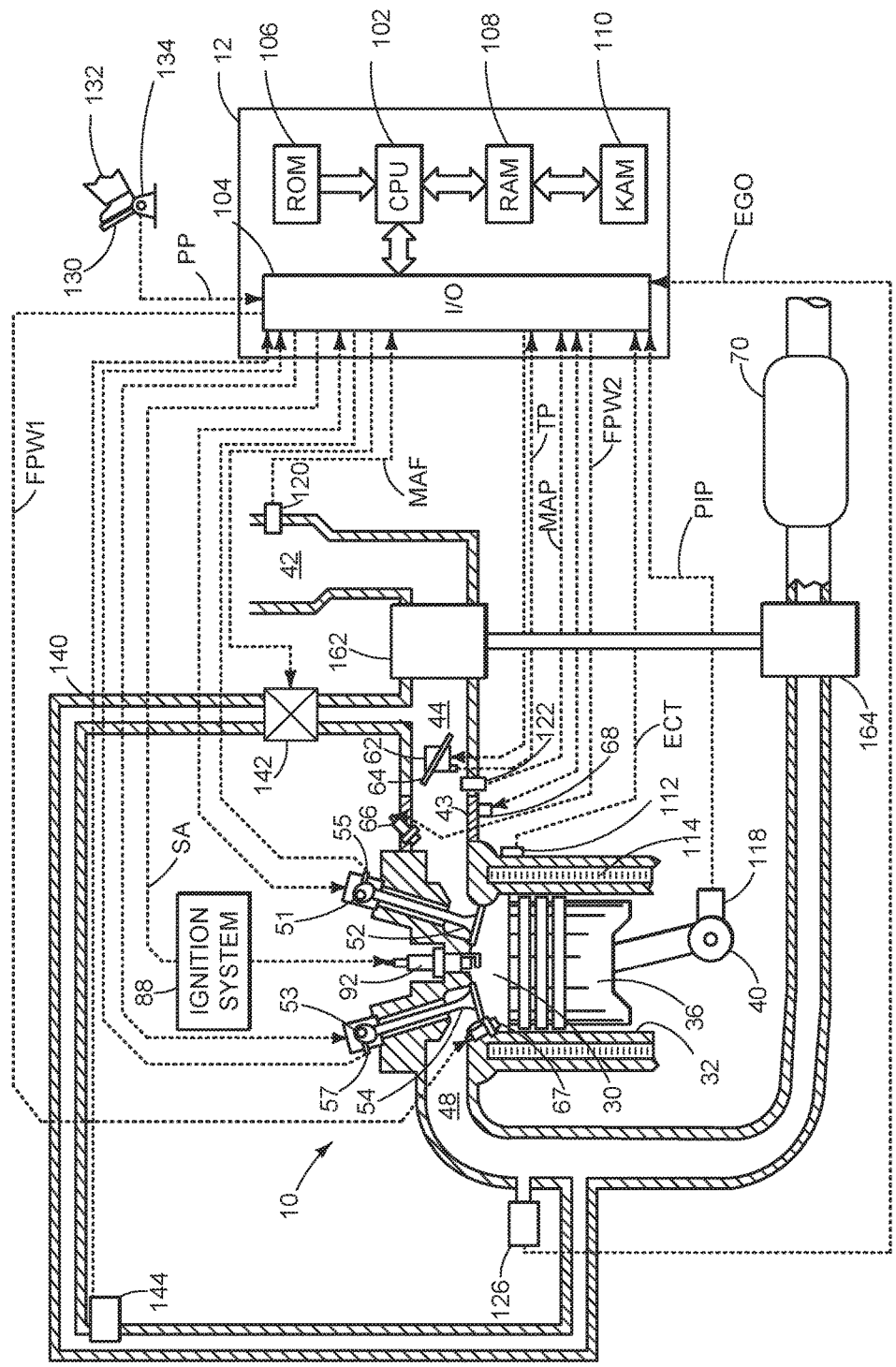
FIG. 1 is a schematic view of an engine of a vehicle.
Figure 4:
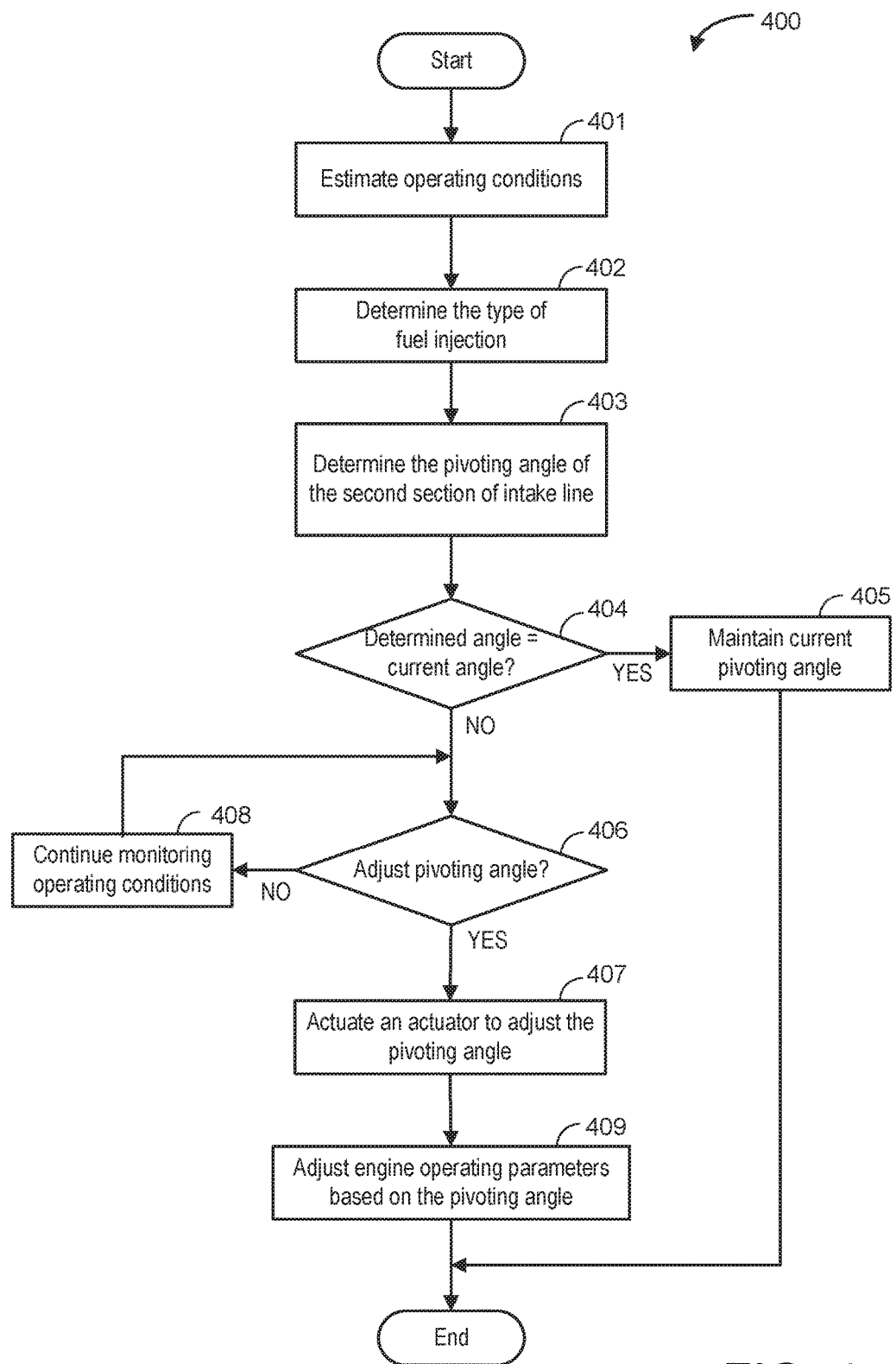
FIG. 4 shows an example method of forming an air-fuel mixture in a combustion chamber of an internal combustion engine.

The following description relates to systems and methods for forming an air-fuel mixture in a combustion chamber of an internal combustion engine system. The formation of the air-fuel mixture may be controlled by actuating an adjustable intake line. The adjustable intake line includes an adjustable section and a fixed section. By adjusting an angle between the two sections, turbulence formed in the combustion chamber may be adjusted. The turbulence may be adjusted in response to engine operating conditions such as engine torque, EGR flow, and the type of fuel injection. Further, turbulence may be adjusted based on the geometry of the combustion chamber. Further still, engine fuel injections may be adjusted based on the air-fuel mixture formation. FIG. 1 shows an example engine system comprising an adjustable intake line. FIGS. 2A-2B show that in the example engine system, by pivoting the adjustable section of the intake line, tumble charge motion may be formed in the combustion chamber. FIGS. 3A-3B show that by pivoting the adjustable section of the intake line, swirl charge motion may be formed in the combustion chamber. FIG. 4 demonstrates an example method of charge motion control during engine operation of the engine system illustrated in FIG. 1.

Turning now to FIG. 1, a schematic diagram illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Intake passage 42 or intake manifold 44 may include an adjustable intake line 43 downstream of throttle 44 to conduct charge into cylinder 30. Adjustable intake line may include a first section directly coupled to an inlet opening of cylinder. The first section is mechanically coupled between the cylinder and a second section of the intake line. The first section is in direct fluid communication with combustion chamber 30 when intake valve 52 is opened. The first section may be partially integrated to a cylinder head. The first section is immovable or fixed to the cylinder. The second section of the adjustable intake line may be pivoted relative to the first section by actuating actuator 68. Actuator 68 may be an electrical motor. By pivoting the second section relative to the first section, a pivoting angle defined by the central axis of the first and second sections is adjusted. The pivoting angle increases with an increased degree of pivot. The formation and intensity of turbulence of air-fuel mixture in the cylinder may be controlled by adjusting the pivoting angle. Actuator 68 may receive commands from controller 12 for adjusting the pivoting angle. A position sensor (not shown) may be coupled to the intake line for sending position information back to controller 12. Details about operating the adjustable intake line are further shown in FIGS. 2A-3B.

In an embodiment, the inlet opening of each cylinder in the multi-cylinder engine may be mechanically coupled to an adjustable intake line, and the adjustable intake lines may be pivoted conjointly. In another embodiment, the cylinder may comprise two inlet openings, wherein a first adjustable intake line is coupled to the first inlet opening, and a second adjustable intake line coupled to a second inlet opening. As an example, the second section of the first adjustable intake line may be pivotable relative to the second section of the second adjustable intake line. As another example, the first and second intake lines of the multi-cylinder engine may be pivoted conjointly. As yet another example, the first and second intake lines of each cylinder may merge to form a pivotable common inlet manifold.

Intake valve 52 may be coupled to the first section of the intake line and be controlled by controller 12 via electric valve actuator (EVA) 51. Similarly, exhaust valve 54 may be coupled to exhaust passage 48 and controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 67 is shown coupled directly to combustion chamber 30 for injecting fuel directly therein in proportion to the pulse width of signal FPW1 received from controller 12. In this manner, fuel injector 67 provides what is known as direct injection of fuel into combustion chamber 30. The fuel injector may be mounted in the side of the combustion chamber or in the top of the combustion chamber, for example. Additionally, fuel injector 66 is shown coupled directly to adjustable intake line 43 for injecting fuel upstream of intake valve 52 in proportion to the pulse width of signal FPW2 received from controller 12. In this manner, fuel injector 66 provides what is known as port injection of fuel into combustion chamber 30. Fuel may be delivered to fuel injectors 67 and 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Further, in the disclosed embodiments, an exhaust gas recirculation (EGR) system may route a desired portion of exhaust gas from exhaust passage 48 to intake manifold 44. In this example, high pressure (HP) EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust $O_2$ sensor and/or an intake oxygen sensor (intake manifold). Under some conditions, the EGR system may be used to regulate the temperature of the air and fuel mixture within the combustion chamber and/or the temperature proximate PF 72. While FIG. 1 shows a high pressure EGR system, a low pressure EGR system may additionally, or alternatively, be used. In a low pressure EGR system, EGR may be routed from downstream of a turbine of a turbocharger to upstream of a compressor of the turbocharger.

Engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Although oxygen sensor 14 and temperature sensor 16 are shown in addition to exhaust gas sensor 126 in FIG. 1, one or more of these sensors may be omitted and/or moved.

Controller 12 is shown in FIG. 1 as a microcomputer, including microprocessor 102, input/output ports 104, an electronic storage medium (e.g., computer-readable) for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from sensor 122. The controller 12 employs the various actuators of FIG. 1 to adjust engine operation based on the received signals and instructions stored on a memory of the controller. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by microprocessor 102 for performing the methods described herein, as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

FIGS. 2A-2B show details of the combustion chamber 30 with the adjustable intake line 43 coupled to one of the inlet opening 211. The inlet opening 211 is equipped with a valve drive which comprises an inlet valve. The inlet valve may shut off the associated inlet opening 211 or open up the associated inlet opening for charge exchange during an opening duration $\Delta t$. Thus, the inlet valve oscillates between an open position and a closed position so as to realize a valve lift $\Delta h$. The inlet valve is received and axially guided in the valve shank guide 251.

Adjustable intake line 43 includes a first section 212 and a second section 213. The first section is fixed relative to the cylinder and the second section is pivotable relative to the first section about a virtual axis. As an example, the first section and the second section of the adjustable intake line may be connected to one another in articulated fashion. The virtual axis may pass a physical spindle coupled between the first and second section of the intake line. As another example, the first section and the second section of the adjustable intake line may be connected to one another via a deformable intermediate element. The virtual axis may pass a point where the intermediate element adjoins the first section.

FIG. 2A shows the adjustable intake line at a zero position, wherein central axis of the first section of the intake line 201 and the central axis of the second section of the intake line 202 are aligned.

In FIG. 2B, by actuating an actuator, such as actuator 68 in FIG. 1, central axis of the second section of the intake line pivots within a plane defined by the longitudinal axis of the cylinder 260 and the central axis of the first fixed section of the intake line, as shown by arrow 250. As an example, the second section may rotate around a virtual axis parallel to the rotation axis of the crankshaft. The virtual axis passes through point 215 on the first section. Point 215 may be a location where the first and section sections adjoin.

At a second position, second section 213 is pivoted relative to the first section 212 so that central axis of the second section 204 forms a pivoting angle $\alpha_2$ with the central axis of the first section 201. As a result, the charge-air flow that enters the combustion chamber 30 via inlet opening 211 is directed substantially toward the outlet opening 221, that is to say toward the outlet-side cylinder wall, shown as charge-air flow 220 in FIG. 2B. The charge-air flow 220 then is diverted as it impinges on the cylinder liner, and is guided along the cylinder wall towards piston 36. When charge-air flow reaches the piston, it is then conducted across the piston crown towards the inlet opening 211. As such, charge-air flow 220 forms a tumble. The air that enters the combustion chamber under the open inlet valve tends to oppose or counteract the formation of said tumble, shown as charge-air flow 230 in FIG. 2B. In this respect, the intensity of the tumble formed correlates with the air fraction between charge-air flow 220 and 230. That is, the intensity of the tumble correlates with the size of the bend $\alpha_2$ formed between the two sections of the intake line. Alternatively, the second section may move to a first position so that its central axis 203 forms pivoting angle $\alpha_1$ with the central axis of the first section 201.

As an example, the first position (203) and the second position (204) of the second section of the intake line define a pivoting range. The zero position (202) may locate at the center of the pivoting range, with $\alpha1=\alpha2$. In one embodiment, the pivoting range may be 70°, with $\alpha1=\alpha2=35°$. In another embodiment, the pivoting range may be less than 70°. In yet another embodiment, the central axes of the first and second sections of the intake line may not align at the zero position (i.e. pivoting angle $\alpha\neq\alpha2$).

Turning to FIG. 3, FIG. 3A is a top view of the cylinder from a direction A shown in FIG. 2B. In FIG. 3A, the second section of intake line 213 pivots about virtual axis 214. The virtual axis 214 is within a plane defined by the central axis of the cylinder and the central axis of the first section of the intake line 201. Virtual axis 214 is further perpendicular to the central axis of the first section of the intake line 201. A pivoting angle of $\alpha_3$ and $\alpha_4$ between the central axes of the first and second sections may form when the second section is moved to the third position 303 and fourth position 304, respectively. As an example, when the intake line is positioned at the fourth position 304 wherein the pivoting angle is $\alpha_4$. The charge-air flow that enters the combustion chamber 30 open inlet opening 211 is, as a result of corresponding pivoting of the second section of the intake line, spinning downwards towards the piston as illustrated by charge-air flow 320. Charge-air flow 320 travels alongside the cylinder wall and forms a swirl. The intensity of the swirl may be controlled by adjusting the pivoting angle.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

FIG. 4 shows an example method 400 for controlling the air-fuel mixture formation in a combustion chamber of an engine, such as an engine shown in FIG. 1. Specifically, charge air motion in a combustion chamber may be controlled by adjusting an adjustable intake line based on engine operating conditions and the configuration of the engine. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At step 401, engine operating conditions are estimated by a controller (e.g., controller 12 in FIG. 1). The controller acquires measurements from various sensors in the engine system and estimates engine operating conditions such as engine load, engine speed, the amount of fuel injection, the amount of EGR flow, position of the crankshaft, and cylinder temperature. The controller may further estimate the presence of knock.

At step 402, the controller determines the type of fuel injection, for example a direct fuel injection or port fuel injection. The type of fuel injection depends both from the configuration of the engine system and the operating conditions. As an example, in addition to injecting a first type of fuel into the combustion chamber, a second fuel may be port injected into the combustion chamber in response to engine knock.

At step 403, a pivoting angle of an adjustable intake line may be determined based on engine operating conditions estimated from step 401 and the type of fuel injection determined from step 402. The adjustable intake line includes a first section fixed relative to the combustion chamber, and a second section pivotable relative to the first section. An example of the adjustable intake line is shown in FIGS. 2A-3B. By increasing a pivoting angle between the central axis of the first and second sections of the adjustable intake line, charge motion of tumble or swirl may be increased. Further, by pivoting the second section of the intake line about different virtual axes, intensity of tumble or swirl may be independently adjusted, as shown for example in FIGS. 2A-3B.

The pivoting angle may be determined based on a predetermined lookup table for the engine system. As an example, the pivoting angle may be adjusted in response to engine load. By increasing the pivoting angle in response to an increase in engine load, charge motion in the cylinder may increase, which facilitates formation of a homogenized air-fuel mixture. Alternatively, the pivoting angle may increase in response to an increased amount of injected fuel. As another example, the pivoting angle may be adjusted in response to engine knock. By increasing the pivoting angle, increased turbulence may increase charge motion and reduce auto-ignition in the air-fuel mixture. As another example, the pivoting angle may be adjusted in response to cylinder temperature or charge air temperature. By increasing the pivoting angle, improved cylinder cooling may be achieved. As another example, the pivoting angle may be controlled in response to the amount of EGR flow. The pivoting angle may be increased in response to an increase in the amount of EGR flow to achieve reliable combustion. As yet another example, the pivoting angle may be adjusted in response to engine speed. A higher pivot angle may be used for lower engine speeds or vise versa.

In yet another example, tumble/swirl may be adjusted based on the intake and exhaust variable cam timing settings and the valve overlap strategy selected by the controller.

At step 404, method 400 determines if the determined pivoting angle from step 403 is the same as current pivoting angle. If the determined pivoting angle is the same as current pivoting angle, method 400 moves to step 405, wherein current pivoting angle is maintained. Otherwise, method 400 moves to step 406.

At step 406, method 400 determines whether the pivoting angle may be adjusted under current engine operating conditions without affecting engine operation. For example, the controller determines current pivoting angle, and calculates the time required for adjusting the current pivoting angle to the determined pivoting angle in step 403. If the intake valve is already lifted or there is insufficient time to adjust the pivoting angle before lifting the intake valve, the pivoting angle may not be adjusted at current engine operating condition. If the pivoting angle may be adjusted without affecting engine operation, method 400 moves on to step 407. Otherwise, method 400 moves to step 408, wherein the engine operating conditions are continuously monitored.

At step 407, an actuator coupled to the second section of the intake line (such as actuator 68 in FIG. 1) is activated to pivot the second section relative to the first section of the intake line. As an example, the second section of the intake line may be pivoted from current position to the determined position from step 403 within an engine cycle. As another example, the second section of the intake line may be pivoted from current position to the determined position stepwise through multiple engine cycles.

At step 409, engine operating parameters may be adjusted based on the pivoting angle. For example, a direction and an amount of fuel directly injected into the cylinder may be adjusted based the pivoting angle. The fuel may predominantly injected against or in the same direction of the prevailing charge motion for improved air-fuel mixing.

In this way, air-fuel mixture formed in the combustion chamber of an internal combustion engine may be controlled by adjusting an adjustable intake line in response to engine operating conditions. The adjustable intake line may be adjusted by pivoting a pivotable section of the intake line relative to a fixed section of the intake line. Further, fuel injected into the combustion chamber may be adjusted based on the position of the adjustable intake line. The technical effect of controlling the air-fuel mixture through an adjustable intake line is that charge motion in the combustion chamber may be controlled. Further, the configuration may easily replace a conventional intake line. The technical effect of pivoting the pivotable section of the intake line is that the intensity of tumble and swirl in the combustion chamber may be independently adjusted based on engine operating conditions and the configuration of the combustion chamber. The technical effect of using the adjustable intake line for charge induction is that pressure loss of charge flowing through the intake line may be minimized. The technical effect of using an adjustable intake line further includes eliminating the issue of soot deposition forming in the intake line in the prior arts. The technical effect of controlling the pivoting angle of the intake line in response to engine conditions is that air-fuel mixture formation may be controlled for reliable combustion under all engine operating conditions.

An adjustable intake line for an engine system, comprising: a first section directly coupled to an inlet opening of an engine cylinder, and a second section mechanically coupled and pivotable relative to the first section via an actuator. In a first example of the adjustable intake line, by pivoting the second section relative to the first section, a pivoting angle between a central axis of the first section and a central axis of the second section is adjusted. A second example of the method optionally includes the first example and further includes the pivoting angle is adjusted in response to engine operating conditions. A third example of the method optionally includes one or more of the first and second examples, and further includes the pivoting angle is adjusted in response to a type of fuel injection. A fourth example of the method optionally includes one or more of the first through third examples, and further includes the first section and the second section are mechanically coupled to one another in an articulated fashion. A fifth example of the method optionally includes one or more of the first through fourth examples, and further includes the first section and the second section are mechanically coupled to one another via an intermediate element. A sixth example of the method optionally includes one or more of the first through fifth examples, and further includes the intermediate element is deformable.

A method for an engine system, comprising: adjusting an angle between a central axis of a first section of an intake line and a central axis of a second section of the intake line via an actuator in response to engine operating conditions, wherein the first section is mechanically coupled between the second section and a cylinder of the engine. In a first example of the method, the first section of the intake line is fixed relative to the cylinder. A second example of the method optionally includes the intake line is in fluid communication with the cylinder when an intake valve is opened. A third example of the method optionally includes one or more of the first and second examples, and further includes by adjusting the angle, a tumble or a swirl of an air-fuel mixture in the cylinder is controlled. A fourth example of the method optionally includes one or more of the first through third examples, and further includes, the angle is within 35 degrees.

An engine system, comprising: at least one cylinder; a first intake line coupled to a first inlet opening of the cylinder, wherein the first intake line includes a first section and a second section; an actuator coupled to the second section of the first intake line; a controller configured with computer readable instructions stored on non-transitory memory for: actuating the actuator to pivot the second section of the first intake line relative to the first section of the first intake line in response to engine operating conditions. In a first example of the system, further comprising at least one fuel injector coupled to the cylinder for directly injecting a fuel into the cylinder, and the controller is further configured for adjusting the injector in response to the degree of pivot. A second example of the system optionally includes the first example and further includes, the injector is adjusted to change the direction of the fuel injected into the cylinder in response to the degree of pivot. A third example of the method optionally includes one or more of the first and second examples, and further includes, the first intake line of each cylinder are pivoted conjointly. A fourth example of the method optionally includes one or more of the first through third examples, and further includes a second intake line coupled to a second inlet opening of the cylinder, wherein the second intake line includes a second section pivotable relative to a first section of the second intake line. A fifth example of the method optionally includes one or more of the first through fourth examples, and further includes, the second section of the first intake line is pivotable relative to the second section of the second intake line. A sixth example of the method optionally includes one or more of the first through fourth examples, and further includes, the first and second intake lines are pivoted conjointly. A seventh example of the method optionally includes one or more of the first through sixth examples, and further includes, the first and second intake lines merge to form a pivotable common inlet manifold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-3, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An adjustable intake line for an engine system, comprising:
   a first section directly coupled to an inlet opening of an engine cylinder, and
   a second section mechanically coupled to the first section and pivotable relative to the first section via an actuator, wherein the first section and the second section are mechanically coupled to one another in an articulated fashion.

2. The adjustable intake line of claim 1, wherein by pivoting the second section relative to the first section, a pivoting angle between a central axis of the first section and a central axis of the second section is adjusted.

3. The adjustable intake line of claim 2, wherein the pivoting angle is adjusted in response to engine operating conditions.

4. The adjustable intake line of claim 2, wherein the pivoting angle is adjusted in response to a type of fuel injection.

5. The adjustable intake line of claim 1, wherein the first section and the second section are mechanically coupled to one another via an intermediate element.

6. The adjustable intake line of claim 5, wherein the intermediate element is deformable.

7. A method for an engine system, comprising:
   adjusting an angle between a central axis of a first section of an intake line and a central axis of a second section of the intake line via an actuator in response to engine operating conditions, wherein the first section is mechanically coupled between the second section and a cylinder of the engine, wherein by adjusting the angle, a tumble or a swirl of an air-fuel mixture in the cylinder is controlled.

8. The method of claim 7, wherein the first section of the intake line is fixed relative to the cylinder.

9. The method of claim 7, wherein the intake line is in fluid communication with the cylinder when an intake valve is opened.

10. The method of claim 7, wherein the angle is within 35 degrees.

11. An engine system, comprising:
    at least one cylinder;
    a first intake line coupled to a first inlet opening of the at least one cylinder, wherein the first intake line includes a first section and a second section;
    an actuator coupled to the second section of the first intake line;
    at least one fuel injector coupled to the at least one cylinder for directly injecting a fuel into the at least one cylinder;
    a controller configured with computer readable instructions stored on non-transitory memory to:
    actuate the actuator to pivot the second section of the first intake line relative to the first section of the first intake line in response to engine operating conditions; and
    adjust operation of the at least one fuel injector in response to a degree of pivot.

12. The system of claim 11, wherein the at least one fuel injector is adjusted to change a direction of the fuel injected into the at least one cylinder in response to the degree of pivot.

13. The system of claim 11, wherein the first intake line of each cylinder is pivoted conjointly.

14. The system of claim 11, further comprising a second intake line coupled to a second inlet opening of the at least one cylinder, wherein the second intake line includes a second section pivotable relative to a first section of the second intake line.

15. The system of claim 14, wherein the second section of the first intake line is pivotable relative to the second section of the second intake line.

16. The system of claim 14, wherein the first and second intake lines are pivoted conjointly.

17. The system of claim 16, wherein the first and second intake lines merge to form a pivotable common inlet manifold.

* * * * *